No. 865,269. PATENTED SEPT. 3, 1907.
E. RENKENBERGER.
HACKSAW MACHINE.
APPLICATION FILED APR. 28, 1906.
3 SHEETS—SHEET 3.
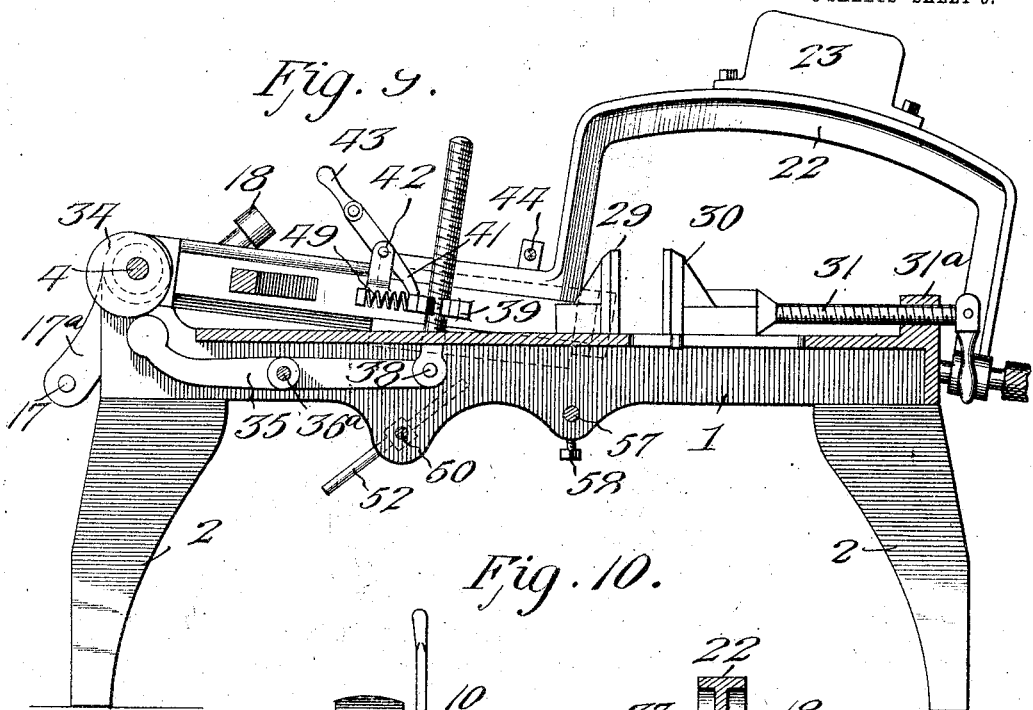
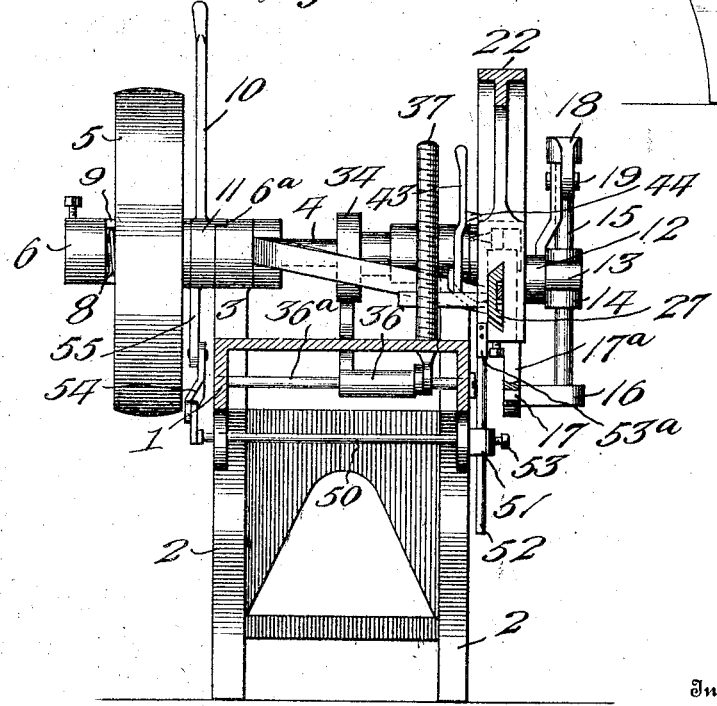
Witnesses
Frank B. Hoffman.
Inventor
Edward Renkenberger
By Victor J. Evans
Attorney

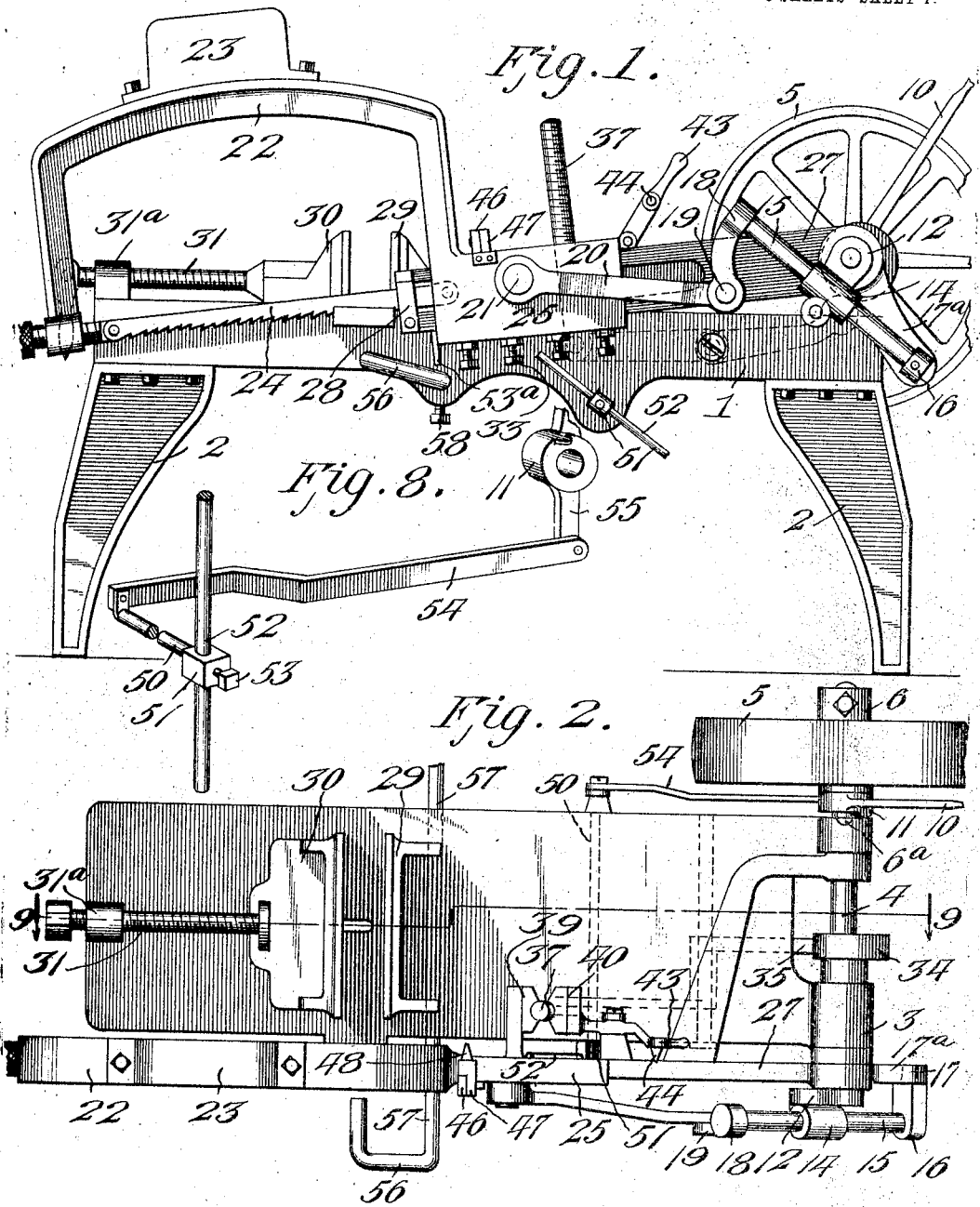

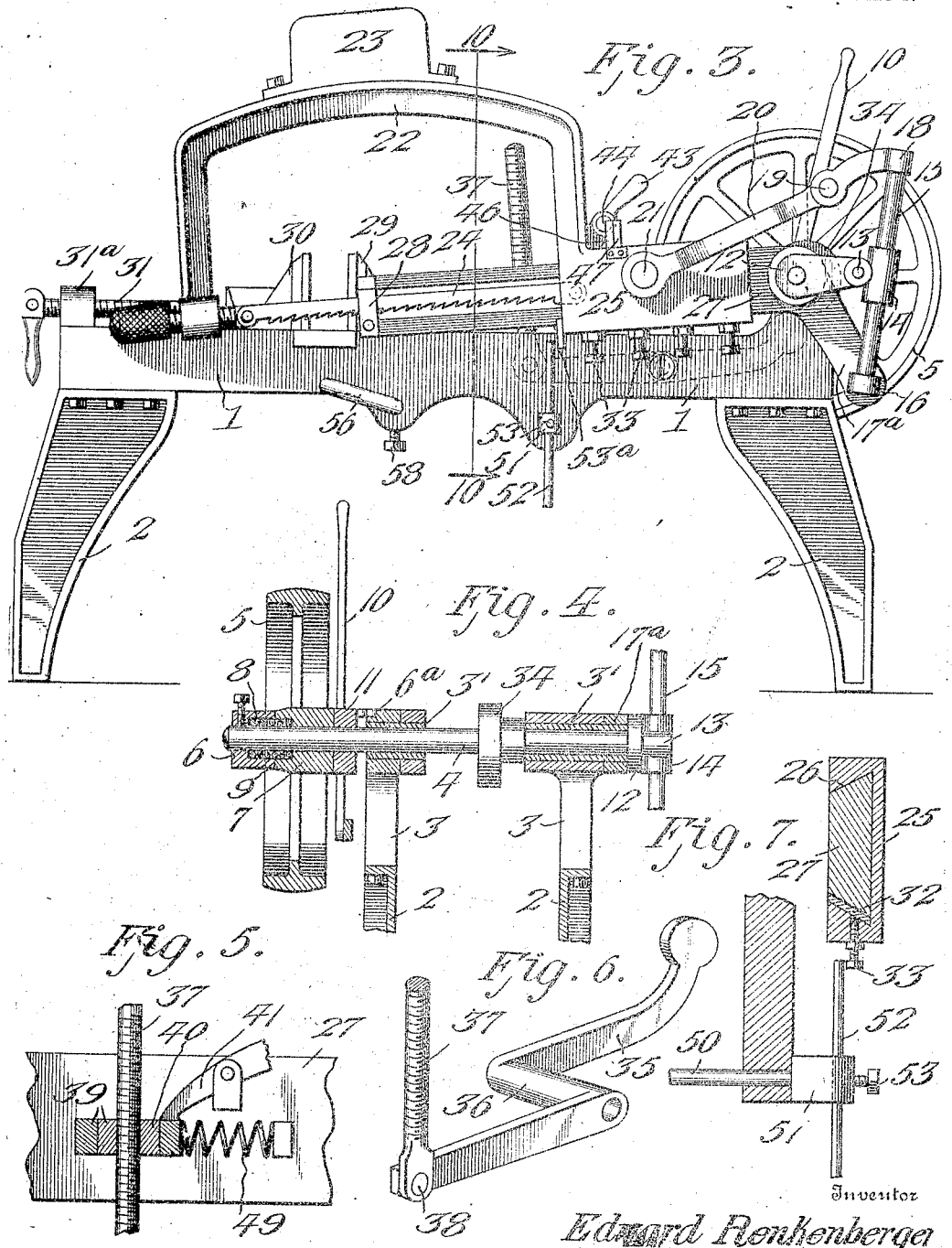

UNITED STATES PATENT OFFICE.

EDWARD RENKENBERGER, OF BUFFALO, NEW YORK.

HACKSAW-MACHINE.

No. 865,269.

Specification of Letters Patent.

Patented Sept. 3, 1907.

Application filed April 28, 1906. Serial No. 314,220.

*To all whom it may concern:*

Be it known that I, EDWARD RENKENBERGER, a citizen of the United States, residing at Buffalo, in the county of Erie and State of New York, have invented new and useful Improvements in Hacksaw-Machines, of which the following is a specification.

This invention relates to hack saw machines, the principal object of the invention being to provide novel and reliable means whereby the saw in its return or backward stroke is lifted out of engagement with the bottom of the kerf, so as to provide an easy and quick return of the saw and its carrying frame and effect a material saving in the wear on saw blades.

A further object of the invention is to provide novel and effective guiding means for the saw frame and the saw carried thereby so as to avoid any overhanging, cumbersome guiding device and yet insure the guidance of the saw frame and saw in a perfectly rectilinear path.

A further object is to provide novel actuating or driving mechanism for communicating the motion of the drive shaft to the saw frame whereby a full length stroke is given to the saw, and a quick return stroke obtained.

With the above and other objects in view, the nature of which will more fully appear as the description proceeds, the invention consists in the novel construction, combination and arrangement of parts, hereinafter more fully described, illustrated and claimed.

In the accompanying drawings, Figure 1 is a side elevation of a hack saw machine embodying the present invention. Fig. 2 is a plan view of the same. Fig. 3 is a side elevation similar to Fig. 1, showing the saw frame just after it has started on its active stroke. Fig. 4 is a vertical longitudinal section through the frame in line with the main drive-shaft. Fig. 5 is a detail sectional elevation of the screw post, the clamping nut, and the portion of the lever which operates one of the nut sections. Fig. 6 is a detail perspective view of the cam-operated lever which carries the screw post. Fig. 7 is a vertical section through the guide rail and runner extension of the saw-frame, showing also the stop limiting the downward movement of the saw-frame. Fig. 8 is a detail perspective view of the operating mechanism for the stop shown in Fig. 7. Fig. 9 is a longitudinal sectional view taken on the line 9—9, Fig. 2, looking in the direction indicated by the arrows. Fig. 10 is a transverse sectional view taken on the line 10—10, Fig. 3, looking in the direction indicated by the arrows.

Referring to the drawings, 1 designates the machine table which is supported at a suitable elevation by means of legs 2 and provided at one end with bearings 3 having bushings 3ª in which the main drive-shaft 4 is journaled, said drive-shaft having loosely mounted thereon a main drive-wheel 5, as shown in Fig. 4.

The drive-wheel is shown in the form of a band pulley adapted to receive and be driven by a belt from any suitable motor. By reference to said Fig. 4, it will be seen that the shaft 4 is provided at its end with a fixed collar 6, and the hub 7 of the wheel 5 is normally held away from the collar 6 by means of an offsetting spring 8. The collar 6 and hub 7 are provided with coacting clutch faces, as shown at 9, and a shifting lever 10 is arranged at the opposite side of the wheel and provided with a cam-faced hub 11 which engages a cam recess 6ª in one of the bearings 3, so that when said lever is rocked in the proper direction, the cam 11 acts to force the wheel 5 laterally and move the clutch faces 9 into engagement, thereby locking the wheel 5 to the shaft 4 and causing said shaft to be driven.

The shaft 4, at its opposite end, is provided with a crank 12, and said crank is pivotally connected at 13 to a runner 14 in the form of a sleeve which slides lengthwise upon a rod or shaft 15 fulcrumed on the machine by means of a cap 16 secured to the lower end of the rod or shaft 15 and provided with a lug or extension 17 on an arm 17ª mounted on the shaft 4, as shown in Figs. 1 and 3.

At the opposite end, the rod or shaft 15 is provided with a head coupling 18, the same being pivotally connected at 19 to one end of a pitman 20, the opposite end of which is connected at 21 to a saw-frame 22. As the shaft 4 rotates, the crank 12, by reason of its connection with the runner 14, causes said runner to travel back and forth on the rod or shaft 15 and vibrates said rod or shaft on its pivotal connection 17. The swinging end of said rod or shaft to which the pitman is connected thus actuates the pitman and drives the saw-frame back and forth, giving a full sweep or stroke thereto.

The saw-frame 22 is, in the main, of the ordinary construction and is equipped with a weight 23 for holding the saw to its work. Said frame is adapted to receive an ordinary hack saw 24, and is provided with the usual means for attaching or securing the saw thereto.

In carrying out the present invention, the saw-frame 22 is provided at its inner end with a runner extension 25 having a dove-tailed guide-way 26 in which is received a correspondingly shaped guide rail 27, one end of which is mounted on the drive-shaft 4, as shown in Fig. 2. The opposite end of said guide rail is provided with a saw-guide 28 which may be arranged close up to the stationary jaw 29, the machine table being provided with the usual stationary jaw 29 and movable and adjustable jaw 30, between which the work is held, the movable jaw being adjusted by means of the ordinary screw 31 having a threaded engagement with a lug 31ª on the table 1 and a swiveled engagement with the movable jaw 30.

In order to take up wear between the runner extension 25 and the guide-rail 27, a gib 32 is interposed between the bottom inclined edge of the rail 27 and the corresponding inner inclined wall of the runner extension 25, said gib being held in place by a plurality of gib adjusting screws 33.

The construction above described provides for guiding the saw-frame in an effective manner without superimposing any cumbersome guiding frame over and above the saw-frame and also provides for guiding and steadying the saw-blade close up to the work, said saw-guide being carried by the guiding means for the saw-frame.

In order to provide for lifting the saw on its return or inoperative stroke, the shaft 4 is provided with a cam 34 which operates against one end of a shipping lever 35 provided intermediate its ends with a sleeve 36 pivoted on a shaft 36ᵃ extending across the frame of the machine, as shown in Fig. 10. Connected to the other end of said lever 35 is an upstanding post 37, the same being pivotally connected at its lower end, as at 38, to the lever 35. The post 37 is preferably screw-threaded, and in connection with said threaded post, I employ a divided clamp or nut consisting of a fixed member 39 fastened directly to the guide-rail 27 and a movable member 40 which is carried by one arm 21 of a lever fulcrumed intermediate its ends at 42, on said guide-rail 27, as shown in Figs. 2 and 5. The other arm of said lever is provided with a handle 43 for rocking the same and is also provided with a laterally projecting lug 44 having inclined faces, as shown in Fig. 2.

Extending upward from the runner extension 25 of the saw-frame is a guide 46 upon which is mounted a block 47 having a laterally projecting lug 48 with inclined faces, as shown, which faces are adapted to come in contact with the corresponding faces on the lug 44 in the reciprocatory movement of the saw-frame. The section 40 of the nut or clamp is normally urged towards the post 38 by means of a spring 49, and said nut or clamp section is held in engagement with the post 37 at all times except when the inclined faces of the lugs 44 and 48 come in contact with each other during the return stroke of the saw-frame.

As the saw-frame starts on its active stroke, the lug 48 strikes against the lug 44, and by reason of the coöperation of the inclined faces of said lugs, the lug 44 is lifted, thus rocking the lever 41 and unclamping the screw post 38, which permits the saw-frame to move downward to its lowest limit with the teeth of the saw resting on the floor or bottom of the kerf. As the saw-frame starts upon its return or inactive stroke, the cam 34 rocks the lever 35, raising the post 37 and lifting the saw-frame until the teeth of the saw 24 are above the bottom of the kerf. As the saw-frame approaches the end of its inactive stroke, the cam operating on the lever 35 gradually lowers the saw until the teeth are nearly in engagement with the bottom of the kerf. Just as the saw starts on its active stroke, the engagement between the post 37 and the guide-rail of the saw-frame is broken, and the saw is left free to move into effective working relation to the material being operated upon.

In order to arrest the movement of the saw-frame, I provide stop mechanism consisting of a rock-shaft 50 having an apertured head 51 to receive a longitudinally adjustable rod 52 held at any adjustment by means of a set screw 53, one end of said rod being adapted to underlie a lug 53ᵃ on the runner extension and be acted on thereby as said extension moves forward. The shaft 50 is coupled by means of a connecting rod 54 to a lever-arm 55 on the hub 11 of the lever 10, and when the saw-frame descends, it acts on the rod 52 to rock the shaft 50 and turn the hub 11 to permit the spring 8 to throw the clutch out of gear and stop the machine.

56 designates an end gage having a shank portion 57 which is adjustable through guides by means of a binding screw 58.

Having thus described the invention, what I claim is:

1. In a hack saw machine, the combination with the machine frame, of a drive-shaft located at one end thereof, a guide-rail having one end pivoted on said shaft, a saw-frame mounted on said guide-rail, a cam on the drive-shaft, a lever operated by said cam, a post carried by said lever, a divided clamp for said post carried by the guide-rail, and means controlled by the movement of the saw-frame for operating said clamp in each stroke of the saw frame.

2. In a hack saw machine, the combination with a reciprocatory saw frame, and a guide-rail therefor, of a vertically-movable post adapted to support the guide-rail, a lever and cam for moving said post, a clamp on the guide-rail for engaging said post, and means controlled by the saw-frame for operating said clamp to disengage the supporting post.

3. In a hack saw machine, the combination of a reciprocatory saw frame, a guide rail on which the saw frame moves, a supporting post for said guide rail, a pivoted lever to which said post is pivoted, a cam shaft, a cam thereon for actuating said lever, and a saw frame clamp for engaging and disengaging said post, substantially as described.

4. In a hack saw machine, the combination of a reciprocatory saw-frame, a guide-rail on which the saw-frame slides, a drive-shaft having operative connection with said saw-frame, a lever operated by a cam on said shaft, a guide-rail supporting post carried by said lever, a clamp for said post connected with the guide-rail, and means on the saw-frame for actuating a part of said clamp during the movement of the saw-frame.

5. In a hack saw, the combination of a reciprocatory saw frame, a guide rail on which the saw frame slides, means for driving the saw frame, a supporting post, a lever pivoted to said post and to the frame, said post supporting said guide rail, a cam shaft, a cam thereon for actuating said lever to raise said guide rail at the end of its active stroke, a post clamping device carried by the guide rail, and means carried by the saw frame for disengaging the clamp from the post at one end of the movement of the saw frame.

6. In a hack saw machine, the combination of a reciprocatory saw-frame, a guide-rail on which said frame slides, means for driving said saw-frame, a vertically movable post on which the guide-rail is supported, a cam lever for moving said post, a two-part clamp carried by the guide-rail, a lever controlling one part of said clamp for moving the latter into and out of engagement with the post, and means carried by the saw-frame for rocking said lever to throw the clamp out of engagement with the post.

In testimony whereof, I affix my signature in presence of two witnesses.

EDWARD RENKENBERGER.

Witnesses:
GEORGE C. RENKENBERGER, Jr.
PETER C. SMITH.